(12) United States Patent
Gonze et al.

(10) Patent No.: US 9,238,995 B2
(45) Date of Patent: Jan. 19, 2016

(54) ENERGY CONTROL SYSTEMS AND METHODS FOR A POWERTRAIN OF A VEHICLE

(71) Applicant: GM GLOBAL TECHNOLOGY OPERATIONS LLC, Detroit, MI (US)

(72) Inventors: Eugene V. Gonze, Pinckney, MI (US);
Stuart R. Smith, Howell, MI (US);
Jennifer M. Stanek, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 677 days.

(21) Appl. No.: 13/673,269

(22) Filed: Nov. 9, 2012

(65) Prior Publication Data
US 2014/0136075 A1    May 15, 2014

(51) Int. Cl.
*F01P 7/16*    (2006.01)

(52) U.S. Cl.
CPC .................. *F01P 7/167* (2013.01); *F01P 7/164* (2013.01); *Y02T 10/6286* (2013.01)

(58) Field of Classification Search
CPC ............. F01P 7/04; F01P 7/048; F01P 7/164; F01P 7/167; Y02T 10/6286; Y02T 10/52
See application file for complete search history.

(56) References Cited

U.S. PATENT DOCUMENTS

| | | | | |
|---|---|---|---|---|
| 6,450,275 B1 * | 9/2002 | Gabriel | .................... | B60K 6/22 165/41 |
| 6,488,345 B1 * | 12/2002 | Woody | ..................... | B60L 7/10 180/165 |
| 8,116,955 B2 * | 2/2012 | Huseman | .................. | B60L 7/18 180/65.31 |
| 2009/0205588 A1 * | 8/2009 | Bilezikjian | ............. | F01P 7/164 123/41.02 |
| 2013/0239913 A1 * | 9/2013 | Young | ....................... | F01P 3/18 123/41.49 |
| 2013/0261832 A1 * | 10/2013 | Bastien | .................. | B60K 11/04 700/296 |

FOREIGN PATENT DOCUMENTS

CN    1239179 A    12/1999

\* cited by examiner

*Primary Examiner* — Hieu T Vo
*Assistant Examiner* — Sherman Manley

(57) ABSTRACT

A system includes a mode module and an energy module. The mode module generates a mode signal based on a temperature of an engine and at least one of a deceleration signal and a regenerative braking signal. The energy module, based on the mode signal, increases cooling of a coolant of the engine during at least one of a deceleration event of a vehicle and a regenerative braking event. The energy module, while increasing the cooling of the coolant, supplies an overvoltage to a cooling pump of the engine.

20 Claims, 5 Drawing Sheets

ENERGY CONTROL SYSTEMS AND METHODS FOR A POWERTRAIN OF A VEHICLE

FIELD

The present disclosure relates to regenerative braking systems and to cooling control systems and fuel control systems of an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include an internal combustion engine (ICE) and an engine control module (ECM). The ECM may control a fuel system and a cooling system of the ICE and one or more regenerative braking systems. The fuel system provides fuel to the ICE and may perform deceleration fuel cut off (DFCO) to conserve fuel. DFCO may include disabling fuel to the ICE. The fuel may be disabled while a driveline (e.g., transmission, driveshaft, axle, and wheels) is engaged to the ICE.

DFCO is used for various reasons. DFCO may be used to provide deceleration (powertrain braking) force when an accelerator of a vehicle is not actuated (e.g., vehicle operator does not press on accelerator pedal). In high elevation (mountainous) areas and/or areas with large variations in elevation, DFCO is used to provide powertrain braking to avoid damage to friction brakes of a vehicle.

DFCO may also be used to prevent damage to a catalytic converter. For example, a throttle position may be calibrated and fixed to provide a minimal amount of air per cylinder (APC) to an engine, thereby providing vehicle deceleration when traveling downhill. Due to the fixed throttle position and/or a manual pull down of a transmission (PRNDL) shifter (e.g., shift into a low gear, such as L1 or L2), the APC levels of the ICE can become too low and cause a misfire. A misfire refers to incomplete combustion of an air/fuel mixture in a cylinder of the engine. This misfire can result in fuel entering and igniting in an exhaust system, which increases the temperature of a catalyst of the catalytic converter. Damage to the catalyst can occur when the temperature of the catalyst exceeds a threshold. By using DFCO, fuel is disabled, which protects the catalyst from misfire events.

DFCO may also be used to increase fuel economy. The efficiency of a gasoline spark ignited engine can be low at minimum combustion (i.e. minimum air and fuel levels) because of pumping losses and other factors. Disabling the fuel is more efficient than reducing the amount of fuel to an ICE.

A cooling system may include an electric cooling pump and an electric cooling fan. The cooling pump circulates coolant through the cooling system including the ICE. The ECM may activate the electric cooling pump by enabling supply of a predetermined voltage (e.g., 12 volts (V)) to the electric cooling pump. The ECM may activate the cooling fan to cool the coolant when the temperature of the coolant is greater than a predetermined temperature.

A regenerative braking system converts kinetic energy generated during engine braking and/or during wheel braking to electrical energy. The electrical energy may be used to charge a vehicle power source and/or used to power electrical components of a vehicle. A regenerative braking system may include one or more generator(s). The generators may apply a braking (i.e., negative) torque on the ICE and/or wheels of a vehicle to perform regenerative braking and produce electrical energy during, for example, deceleration of the ICE and/or vehicle.

SUMMARY

A system is provided and includes a mode module and an energy module. The mode module generates a mode signal based on a temperature of an engine and at least one of a deceleration signal and a regenerative braking signal. The energy module, based on the mode signal, increases cooling of a coolant of the engine during at least one of a deceleration event of a vehicle and a regenerative braking event. The energy module, while increasing the cooling of the coolant, supplies an overvoltage to a cooling pump of the engine.

A method is provided and includes generating a mode signal based on a temperature of an engine and at least one of a deceleration signal and a regenerative braking signal. Based on the mode signal, increasing cooling of a coolant of the engine during at least one of a deceleration event of a vehicle and a regenerative braking event. Supplying an overvoltage to a cooling pump of the engine while increasing the cooling of the coolant.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The implementations disclosed herein include coordinated cooling system operation during (i) vehicle deceleration and/or decreased engine loading events, (ii) regenerative braking events, and (iii) vehicle acceleration and/or increased engine loading events. The coordinated control provides increased cooling during regenerative braking events and decreased cooling during vehicle acceleration and/or increased engine loading events. As a result, fuel consumption is reduced during vehicle acceleration and/or increased engine loading events thereby providing increases fuel efficiency.

A traditional cooling system may reduce and/or turn OFF a cooling pump and/or a cooling fan during regenerative braking. The implementations disclosed herein include operating a cooling pump and a cooling fan in a full ON state during regenerative braking. The voltage of the cooling pump may be temporarily increased to a voltage (e.g., 16V) greater than a predetermined voltage (e.g., 12V) to provide increased cooling. This provides a maximum amount of cooling during regenerative braking. As a result of the increased cooling provided during regenerative braking, ON time and/or speed of the cooling pump and/or speed of the cooling fan may be decreased during vehicle acceleration and/or increased engine loading events. Due to the decreased speeds of the cooling pump and fan, load on the engine is decreased, which conserves fuel. These implementations and others are further described below with respect to FIGS. 1-6.

Figure 1:
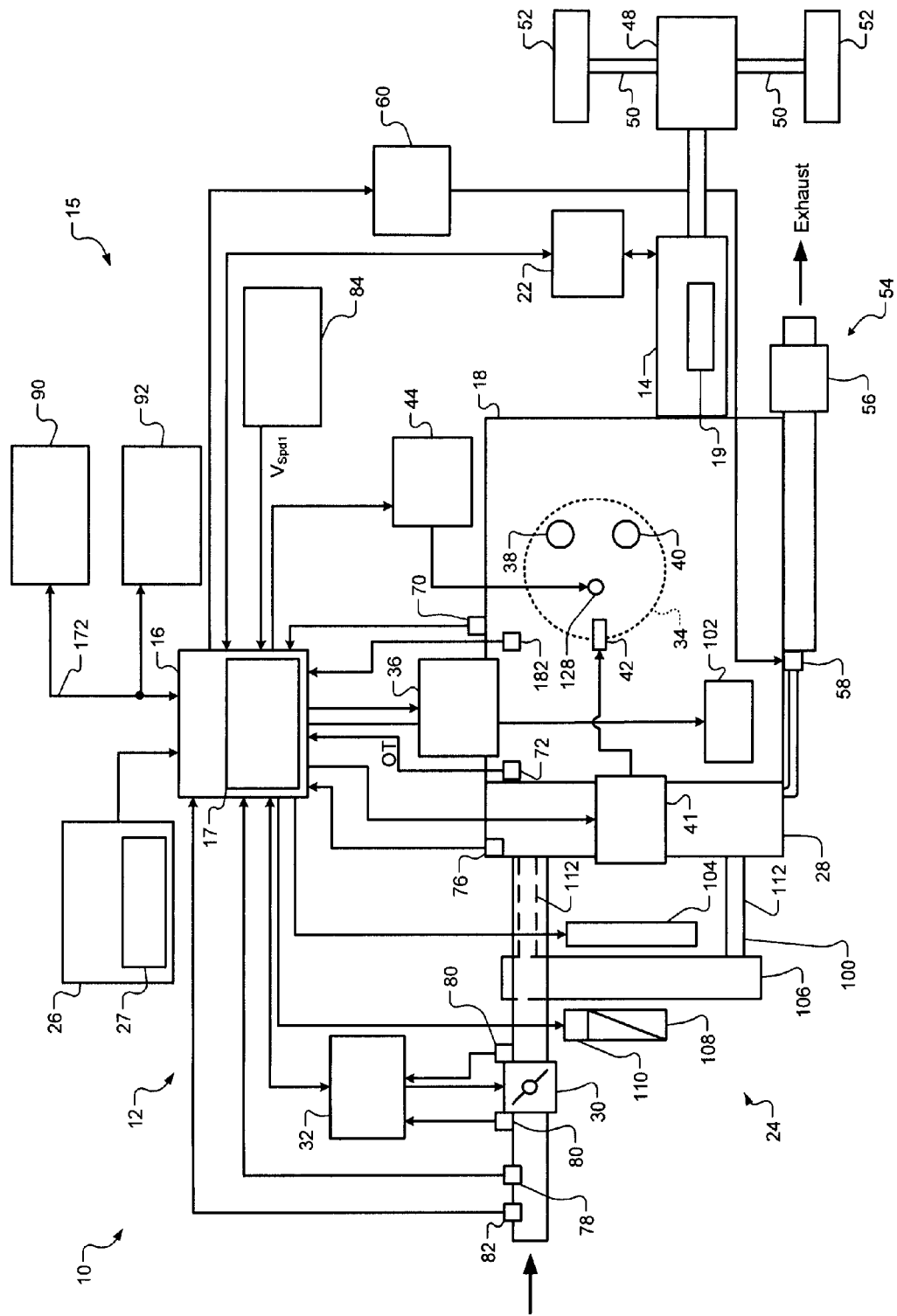
FIG. 1 is a functional block diagram of a powertrain system incorporating an energy control system in accordance with the present disclosure.

In FIG. 1, a functional block diagram of a powertrain system 10 is presented. The powertrain system 10 includes an engine system 12, a transmission system 14, and the energy control system 15. The engine system 12 includes an engine control module (ECM) 16 with an energy control module 17 and an internal combustion engine (ICE) 18. The transmission system 14 includes a transmission control module (TCM) 22. The transmission system 14 may include, for example, an automatic transmission, a semi-automatic transmission, a dual clutch transmission, etc. (hereinafter transmission 19). The energy control system 15 includes the energy control module 17 and a cooling system 24.

The ICE 18 combusts an air/fuel mixture to produce drive torque for a vehicle based on driver input(s) from one or more driver input module(s) 26. The driver input module(s) 26 may include an accelerator pedal, a brake pedal and corresponding sensors 27. The sensors 27 may generate a first pedal signal PEDAL1 and a second pedal signal PEDAL2, which may be included in the driver input(s).

Air is drawn into an intake manifold 28 through a throttle valve 30. The ECM 16 controls a throttle actuator module 32, which regulates opening of the throttle valve 30 to control the amount of air drawn into the intake manifold 28. Air from the intake manifold 28 is drawn into cylinders (one cylinder 34 is shown) of the ICE 18. The ECM 16 may instruct a cylinder actuator module 36 to selectively deactivate some of the cylinders, which may improve fuel economy under certain engine operating conditions. The cylinder actuator module 36 may deactivate the cylinder 34 by disabling opening of the intake valve 38 and/or an exhaust valve 40 via, for example, electromagnetic actuators. The ICE 18 may operate using a four-stroke cylinder cycle. The four strokes, described below, are named the intake stroke, the compression stroke, the combustion stroke, and the exhaust stroke. During each revolution of a crankshaft (not shown), two of the four strokes occur within the cylinder 34.

During the intake stroke, air from the intake manifold 28 is drawn into the cylinder 34 through an intake valve 38. The ECM 16 controls a fuel actuator module 41, which regulates fuel injection of a fuel injector 42 to achieve a desired air/fuel ratio. The fuel actuator module 41 may halt injection of fuel to cylinders that are deactivated.

The injected fuel mixes with air and creates an air/fuel mixture in the cylinder 34. During the compression stroke, a piston (not shown) within the cylinder 34 compresses the air/fuel mixture. Based on a signal from the ECM 16, a spark actuator module 44 energizes a spark plug 46 in the cylinder 34, which ignites the air/fuel mixture. This drives the piston downward and drives the transmission 19. An output shaft of the transmission 19 is coupled to an input of a differential gear 48. The differential gear 48 drives axles 50 and wheels 52.

The spark actuator module 44 may be controlled by a timing signal specifying how far before or after TDC to generate the spark. Because piston position is directly related to crankshaft rotation, operation of the spark actuator module 44 may be synchronized with crankshaft angle. In various implementations, the spark actuator module 44 may halt provision of spark to deactivated cylinders.

During the combustion stroke, the combustion of the air/fuel mixture drives the piston down, thereby driving the crankshaft. During the exhaust stroke, the piston begins moving up from bottom dead center (BDC) and expels the byproducts of combustion through an exhaust valve 40. The byproducts of combustion are exhausted from the vehicle via an exhaust system 54. A catalyst 56 receives exhaust gas output by the ICE 18 and reacts with various components of the exhaust gas. For example only, the catalyst 56 may include a three-way catalyst (TWC), a catalytic converter, or another suitable exhaust catalyst.

The powertrain system 10 may include an exhaust gas recirculation (EGR) valve 58, which selectively redirects exhaust gas back to the intake manifold 28. The EGR valve 58 may be controlled by an EGR actuator module 60.

The powertrain system 10 may measure the speed of the crankshaft (i.e., engine speed) in revolutions per minute (RPM) using an RPM sensor 70. Temperature of engine oil may be measured using an oil temperature (OT) sensor 72. Temperature of engine coolant may be measured using an engine coolant temperature (ECT) sensor 74. The OT sensor 72 may generate a temperature signal $T_{Oil}$. The ECT sensor 74 may generate a coolant temperature signal $T_{Cool}$. The ECT sensor 74 may be located within the ICE 18 or at other locations where the coolant is circulated, such as a radiator (not shown).

The pressure within the intake manifold 28 may be measured using a manifold absolute pressure (MAP) sensor 76. The mass flow rate of air flowing into the intake manifold 28 may be measured using a mass air flow rate (MAF) sensor 78. In various implementations, the MAF sensor 78 may be located in a housing that also includes the throttle valve 30.

The throttle actuator module 32 may monitor the position of the throttle valve 30 using one or more throttle position sensors (TPS) 80. The ambient temperature of air being drawn into the ICE 18 may be measured using an intake air temperature (IAT) sensor 82.

The powertrain system 10 and the cooling system 24 may further include a vehicle speed sensor 84. The vehicle speed sensor 84 may generate a vehicle speed signal $V_{SPD1}$ indicative of a vehicle speed of the vehicle. The vehicle speed sensor 84 may be, for example, a transmission, driveshaft, axle, and/or wheel speed sensor. The ECM 16 may use signals from one or more of the sensors to make control decisions for the powertrain system 10.

The ECM 16 and generator(s) 90 are part of a regenerative braking system. The ECM 16 may communicate with and control output voltage(s) of generator(s) 90. The generator(s) 90 may be used to produce electrical energy for use by vehicle electrical systems and/or for storage in a power source 92 (e.g., a battery). The production of electrical energy may be referred to as regenerative braking. The generator(s) 90 may apply a braking (i.e., negative) torque on the ICE 18, transmission 19, wheels 52 or other drivetrain component(s) to perform regenerative braking and produce electrical energy.

Each system that varies an engine parameter may be referred to as an engine actuator. Each engine actuator receives an associated actuator value. For example, the throttle actuator module 32 may be referred to as an engine actuator and the throttle opening area may be referred to as the associated actuator value. In the example of FIG. 1, the throttle actuator module 32 achieves the throttle opening area by adjusting an angle of the blade of the throttle valve 30.

The cooling system 24 includes a cooling circuit 100, a cooling pump 102, a cooling fan 104, a radiator 106, one or more shutter(s) 108, and corresponding shutter motor(s) 110. The cooling circuit 100 includes the ICE 18, the cooling pump 102, the radiator 106, and cooling fluid lines 112. The energy control module 17 controls ON and OFF times and speeds of the cooling pump 102 and cooling fan 104. The energy control module 17 also controls position(s) of the shutter(s) 108 via the shutter motor(s) 110. The cooling pump 102 circulates a coolant through the cooling circuit 100. The cooling fan 104 draws air through the radiator 106 to cool the coolant. The shutter(s) 108 allow air to pass through the radiator 106.

Figure 2:
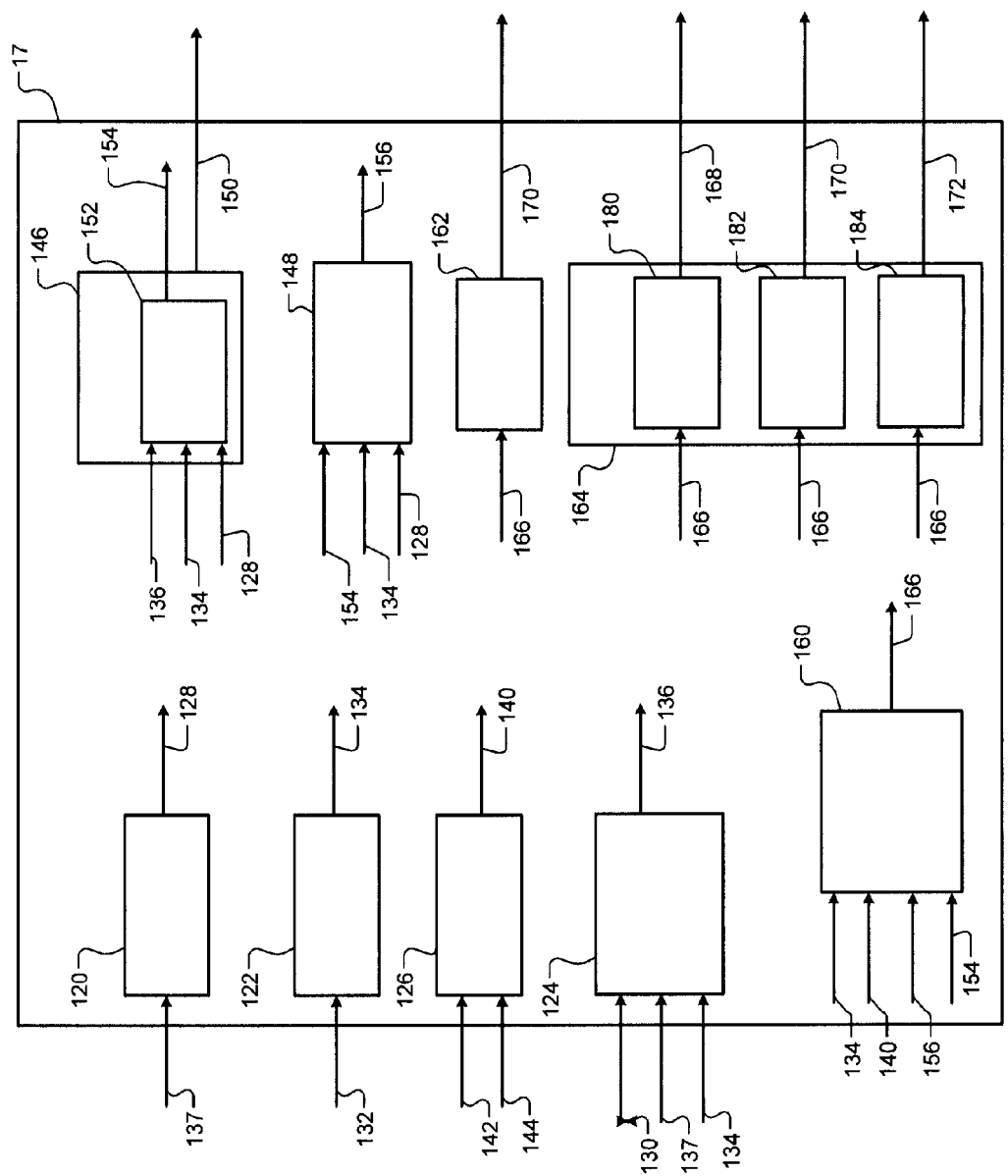
FIG. 2 is a functional block diagram of an energy control module in accordance with the present disclosure.

Referring now also to FIG. 2, the energy control module 17 is shown. The energy control module 17 includes a brake module 120, a speed module 122, an acceleration module 124 and a temperature module 126. The brake module 120 generates a brake signal BRK (128) indicating whether wheel braking is being performed. The brake signal BRK (128) may be generated based on the brake pedal signal PEDAL1 (130).

The speed module 122 determines speed of the vehicle based on the first vehicle speed signal $V_{SPD1}$ (132) and generates a second vehicle speed signal $V_{SPD2}$ (134) indicating the vehicle speed. The acceleration module 124 determines acceleration and/or deceleration of the vehicle and generates an acceleration signal ACCEL (136). The acceleration signal ACCEL (136) may be generated based on the pedal signals PEDAL1, PEDAL2 (137) and the second vehicle speed signal $V_{Spd2}$. The temperature module 126 determines a temperature of the ICE 18 and generates a temperature signal TEMP (140) that is indicative of the temperature. The temperature may be determined based on one or more of the temperatures signals $T_{Cool}$ (142), $T_{Oil}$ (144).

The energy control module 17 further includes a fuel control module 146 and a regeneration module 148. The fuel control module 146 controls fuel injection of the ICE 18 and generates a fuel control signal FUEL (150). The fuel control signal FUEL indicates an amount of fuel, an opening level of one or more fuel injectors, other fuel injection parameters. The fuel control module 146 includes a fuel cutoff module 152 that determines whether fuel to the ICE 18 is to be cutoff. Fuel to the ICE 18 may be cutoff during deceleration events and/or when vehicle speed of the vehicle is equal to zero and/or less than a predetermined speed. The fuel cutoff module 152 may generate a fuel cutoff signal DECEL (154) to perform a deceleration fuel cutoff (DFCO) event and indicate that fuel to the ICE 18 is cutoff. A DFCO event may be performed while the vehicle is ON, but vehicle speed is decreasing and/or is equal to 0. The fuel cutoff signal DECEL may be generated based on the acceleration signal ACCEL, the second vehicle speed signal $V_{Spd2}$, and/or the brake pedal signal BRK.

The regeneration module 148 determines whether a regenerative event is being performed. The regenerative event may be an engine braking event and/or a wheel braking event. The engine braking event refers to when a negative torque is being applied to the ICE 18 via the generator(s) 90 during deceleration of the vehicle. The wheel braking event may refer to when the generator(s) 90 are applying a negative torque on one of the axles 50 and/or wheels 52. The regeneration module 148 generates a regenerative braking signal REG (156) based on the fuel cutoff signal DECEL, the second vehicle speed signal $V_{Spd2}$, and/or the brake pedal signal BRK. The regenerative braking signal REG indicates whether regenerative braking is being performed.

The energy control module 17 further includes a mode determination module 160, a generator module 162 and a cooling system module 164. The mode determination module 160 determines an operating mode of the cooling system 24 and generates a mode signal MODE (166). The ICE 18 and cooling system 24 may operate in a DECO mode, a regenerative braking mode, a non-DECO mode, a non-regenerative braking mode, a temperature-based cooling mode, a maximum cooling mode, and/or an over-cooling mode. The DFCO mode refers to when fuel to the ICE 18 is deactivated and the vehicle is in an ON state. This may occur when the ICE 18 is deactivated and/or when speed of the ICE 18 is zero and/or less than a predetermined engine speed. The non-DFCO mode refers to when fuel to the ICE 18 is not cutoff (or deactivated).

The regenerative braking mode refers to when engine braking and/or wheel (or axel) braking is being performed. The non-regenerative braking mode refers to when engine braking and wheel braking is not being performed.

The temperature-based cooling mode refers to when a cooling pump signal PUMP (168), a cooling fan signal FAN (170), and a shutter signal SHUT (172) are set based on the temperature signal TEMP. The cooling pump signal PUMP indicates the speed of the cooling pump 102. The cooling fan signal FAN indicates the speed of the cooling fan 104. The shutter signal SHUT indicates position(s) of the shutter(s) 108. During the temperature-based cooling mode the fuel to the ICE 18 may remain activated.

The maximum cooling mode refers to when the cooling pump signal PUMP and cooling fan signal FAN indicate full ON speeds, and shutter signal SHUT indicates the position(s) of the shutter(s) 108 are set to fully OPEN position(s). During the temperature-based cooling mode the fuel to the ICE 18 may be activated or deactivated.

The over-cooling mode refers to when the cooling pump signal PUMP indicates that the cooling pump 102 is in an over-cooling state. This may include applying an overvoltage to the cooling pump 102. The overvoltage may be greater than a predetermined voltage, a maximum voltage used during the maximum cooling mode, and/or a maximum rated operating voltage of the cooling pump 102. During the over-cooling mode, the cooling fan signal FAN indicates that the cooling fan is fully ON and the shutter signal SHUT indicates that the shutter(s) are fully open. During the over-cooling mode, fuel to the ICE 18 may be cutoff (or deactivated).

The generator module 162 generates one or more generator control signal(s) CONT (170) to control output voltage(s) of the generator(s) 90 and/or a bus voltage of a bus 172 of FIG. 1. The bus 172 may be connected to the ECM 16, the generator(s) 90, the power source 92, and/or the cooling pump 102. During the temperature-based cooling mode the generator control signal(s) CONT may set output voltage(s) of the generator(s) 90 based on the temperature signal TEMP. For example, the higher the temperature indicated by the temperature signal TEMP, the higher the voltage generated by the generator(s) 90 and/or the higher the bus voltage. The bus voltage may be provided to the cooling pump 102. This increases cooling as performed by the cooling pump 102. The bus voltage may be in a predetermined voltage range. In one implementation and for a 12V cooling pump, the voltage range may be, for example, 8-13V. In another implementation and for a 12V cooling pump, the voltage range may be, for example, 8-16V.

During the maximum temperature-based cooling mode, the generator control signal(s) CONT may set the output voltage(s) to predetermined maximum output voltages. The predetermined maximum output voltages may be equal to a maximum rated voltage of the cooling pump 102. In one implementation, the maximum rated voltage is 12.6V for a 12V cooling pump. In another implementation, the predetermined maximum output voltages are set equal to 16V for a 12V cooling pump.

During the over-cooling mode, the generator control signal(s) CONT may set the output voltage(s) to predetermined maximum output voltages and/or to overvoltage(s). The overvoltage(s) may be equal to a predetermined overvoltage of the cooling pump 102 and used to provide over-cooling of the coolant in the cooling circuit 100. The overvoltage may be set within a predetermined range. The predetermined range may be, for example 12.6-16V for a 12V cooling pump. In one implementation, the overvoltage is greater than the maximum rated voltage and/or greater than the predetermined maximum output voltages of the generator(s) 90. In another implementation, the overvoltage is equal to 16 V for a 12 V cooling pump.

The cooling system module 164 includes a pump module 180, a fan module 182, and a shutter module 184. The pump module 180 generates the cooling pump signal PUMP based on the mode signal MODE. The fan module 182 generates the cooling fan signal FAN based on the mode signal MODE. The shutter module 184 generates the shutter signal SHUT based on the mode signal MODE.

Figure 3:
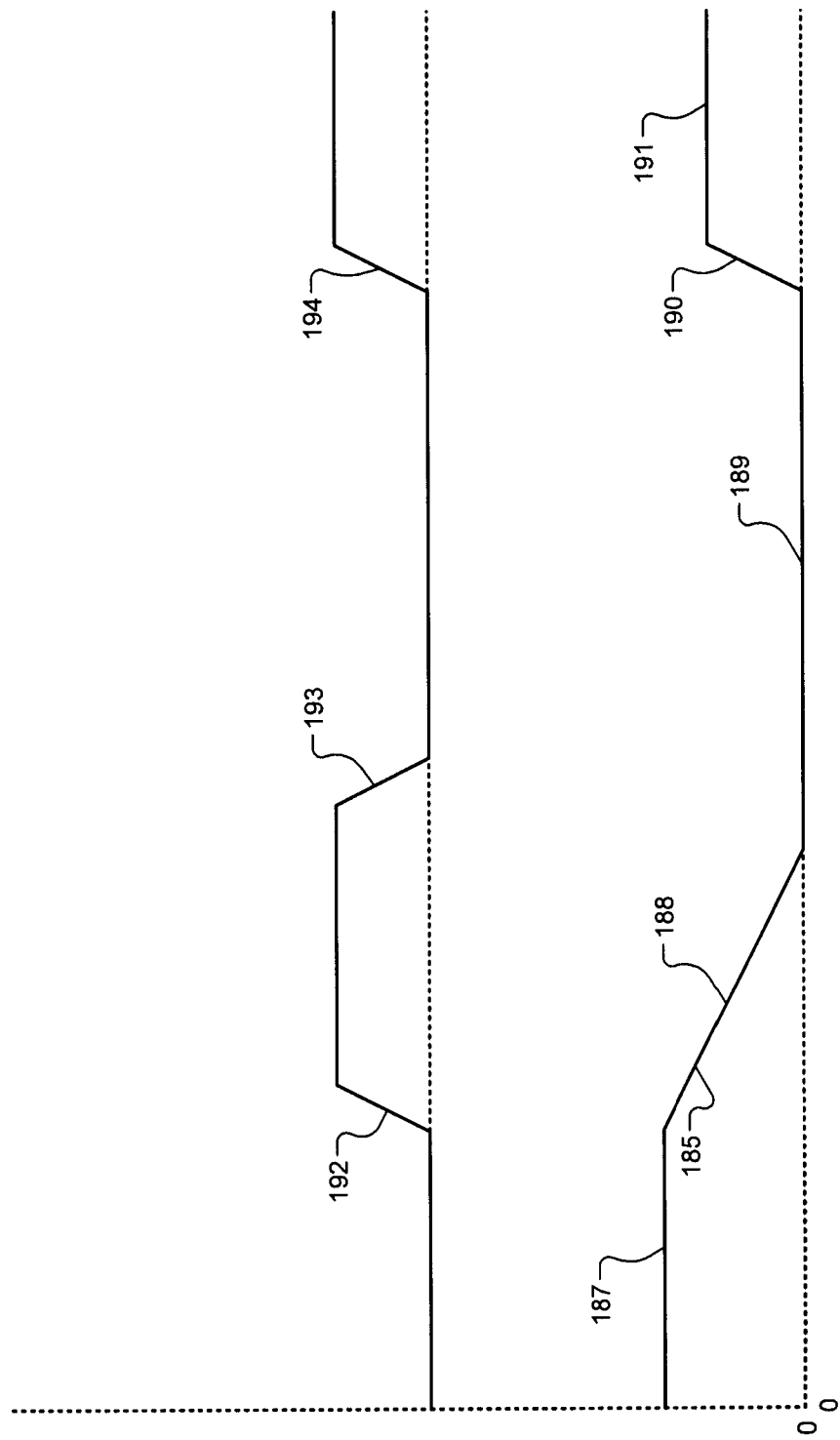
FIG. 3 is a cooling pump, cooling fan and vehicle speed timing plot in accordance with the present disclosure.

Referring now also to FIG. 3, a cooling pump, cooling fan and vehicle speed timing plot is shown. The energy control system 15 and/or energy control module 15 of FIGS. 1 and 2 control the speeds of the cooling pump 102 and the cooling fan 104 based on vehicle speed, vehicle deceleration events, vehicle acceleration events, DFCO events, regenerative braking events, etc.

In FIG. 3, a vehicle speed signal 185 and a cooling pump and cooling fan ON-time signal 186 are shown. A first zero-acceleration event (acceleration of the vehicle is equal to 0) occurs at 187, a deceleration event occurs at 188, a second zero-acceleration event and a zero-vehicle speed event (vehicle speed is equal to 0) occurs at 189, an acceleration event occurs at 190, and a third zero-acceleration event occurs at 191. A DFCO event and/or a regenerative braking event may occur during the deceleration event. The ICE 18 may be deactivated or shutdown during a DFCO event and activated prior to or during an acceleration event.

The cooling pump 102 and the cooling fan 104 are turned ON and/or speeds of the cooling pump 102 and the cooling fan 104 are increased when the deceleration event begins, shown at 192. The energy control module 17 may increase cooling during each deceleration event, each DFCO event, and/or each regenerative braking event. The speeds of the cooling pump 102 and the cooling fan 104 are maintained at the increased speeds during the deceleration event. In addition to increasing speeds of the cooling pump 102 and the cooling fan 104 during deceleration, DECO and/or regenerative braking events, the shutter(s) 108 may be opened or further opened to provide additional cooling.

The cooling pump 102 and the cooling fan 104 may be turned OFF and/or the speeds of the cooling pump 102 and the cooling fan 104 may be decreased at the end of the deceleration event, shown at 193. As an alternative, the speeds of the cooling pump 102 and the cooling fan 104 may be decreased subsequent to the end of the deceleration event. Openings of the shutter(s) 108 may be reduced or closed at the end of the deceleration event or subsequent to the end of the deceleration event.

The cooling pump 102 and the cooling fan 104 are turned ON and/or speeds of the cooling pump 102 and the cooling fan 104 are increased when the acceleration event begins, shown at 194. This may include opening or further opening the shutter(s) 108. The speeds of the cooling pump 102 and/or cooling fan 104 may be initially less during a first or beginning portion of the acceleration event and/or during a first or beginning portion of the third zero-acceleration event that occurs subsequent to the acceleration event. The cooling pump 102 and the cooling fan 104 may be operated at reduced speeds due to the increased amount of cooling provided during the deceleration event. Since over-cooling is provided during the deceleration event, under-cooling may be provided during the acceleration event (or increased ICE loading event) and/or an event subsequent to the acceleration event.

Over-cooling may refer to providing greater than a predetermined amount of cooling and/or reducing a temperature of the coolant in the cooling circuit 100 to a temperature that is less than a predetermined temperature. The ECM 16 may maintain the coolant at the predetermined temperature during non-DFCO events, non-regenerative braking events, and/or when the vehicle is not decelerating. Under-cooling may refer to providing less than the predetermined amount of cooling and/or allowing the temperature of the coolant to increase to the predetermined temperature. Under-cooling may be provided subsequent and due to over-cooling.

During a deceleration event, DFCO event, and/or regenerative braking event, a cooling system may reduce and/or turn OFF a cooling pump and/or a cooling fan, as a smaller amount of cooling is needed to maintain an ICE at a predetermined temperature and/or within a predetermined temperature range. The energy control system 15, the energy control module 17 and the cooling system 24 provide over-cooling during these events to over cool the coolant in the cooling circuit 100 of the ICE 18. The power generated due to regenerative braking is used to power the cooling pump 102, the cooling fan 104, and the shutter motor(s) 110. This temporarily allows for a decreased amount of cooling during subsequent operating events, where the cooling pump 102 and the cooling fan 104 are operated based on energy generated by the ICE 18. Since a smaller amount of cooling is needed, the cooling pump 102 and/or cooling fan 104 are operated at reduced speeds. As a result, less loading is applied to the ICE 18, which improves fuel economy.

Figure 4:
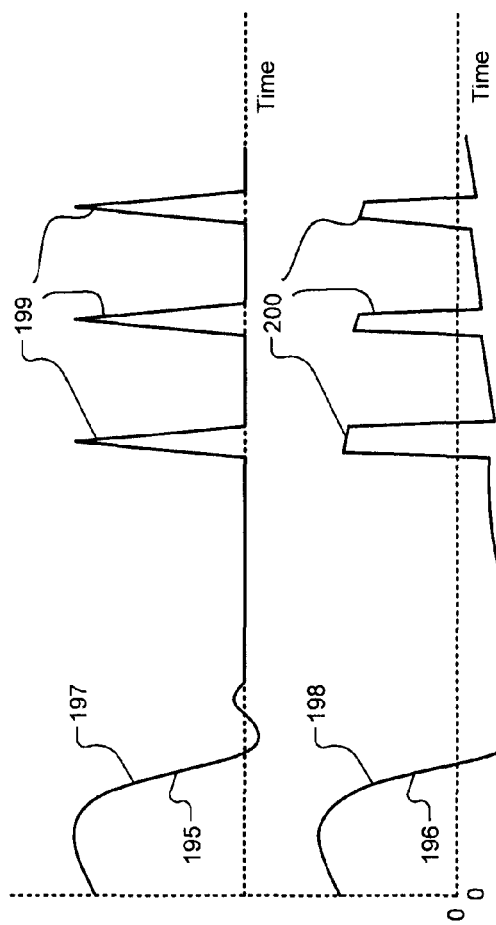
FIG. 4 is a regulated bus voltage and current plot illustrating changes during regenerative braking events in accordance with the present disclosure.

Referring now to FIGS. 1-2 and 4, a regulated bus voltage and current plot illustrating changes during regenerative braking events is shown. A bus voltage signal 195 and a bus current signal 196 of the bus 172 are shown. First portions 197, 198 of the bus voltage signal 195 and the bus current signal 196 illustrate voltage and current regulation of the bus 172 including charging and discharging of the power source 92. In addition, voltage and current changes (shown as voltage and current pulses 199, 200) for three regenerative braking events are illustrated. During each of the regenerative braking events, the generator(s) 90 may be supplying increased levels of voltage and current to the bus 172. The increased level of voltage provided during the regenerative braking event may be provided to the cooling pump 102 to increase levels of cooling and/or over-cooling during regenerative braking.

The increased level of voltage may be a predetermined level, a maximum voltage level for the cooling pump 102, and/or an overvoltage for the cooling pump 102. This maximizes coolant flow and a rate of cooling during vehicle deceleration, DFCO, and/or regenerative braking events. This also reduces operation time of the cooling pump 102 and/or decreases speed of the cooling pump 102 during subsequent under-cooling events and/or decreases overall operating times of the cooling pump 102 and/or the cooling fan 104.

Figure 5:
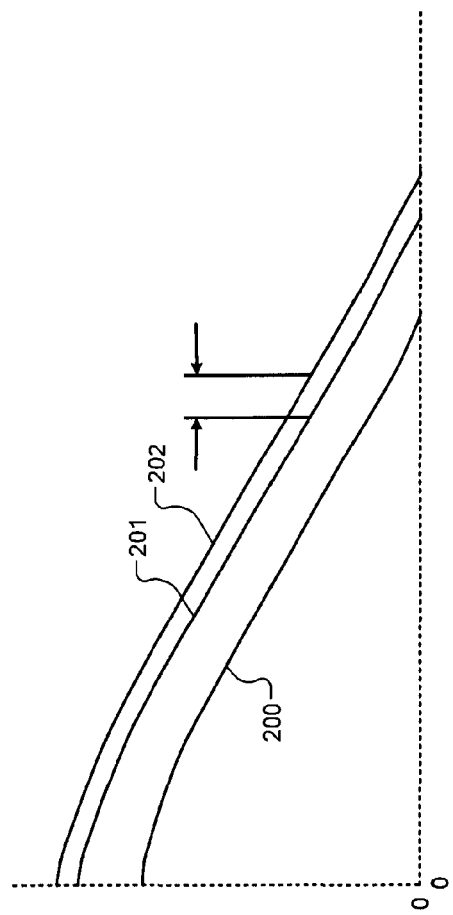
FIG. 5 is a coolant pressure versus coolant flow plot in accordance with the present disclosure.

Referring now to FIGS. 1-2 and 5, a coolant pressure versus coolant flow plot is shown. Three coolant pressure versus coolant flow curves (200, 201, 202) are shown. Each of the curves 200-202 is associated with a different cooling pump voltage. As an example, the first curve 200 is associated with a first voltage (e.g., 8 V), the second curve 201 is associated with a second voltage (e.g., 12 V), and the third curve 202 is associated with a third voltage (e.g., 16 V). As voltage of the cooling pump 102 increases, a proportional change in the amount of coolant flow increases. The change between the second and third curves is shown as Δ flow. In one implementation, the increase in coolant flow between the second and third voltages is 10%.

Figure 6:
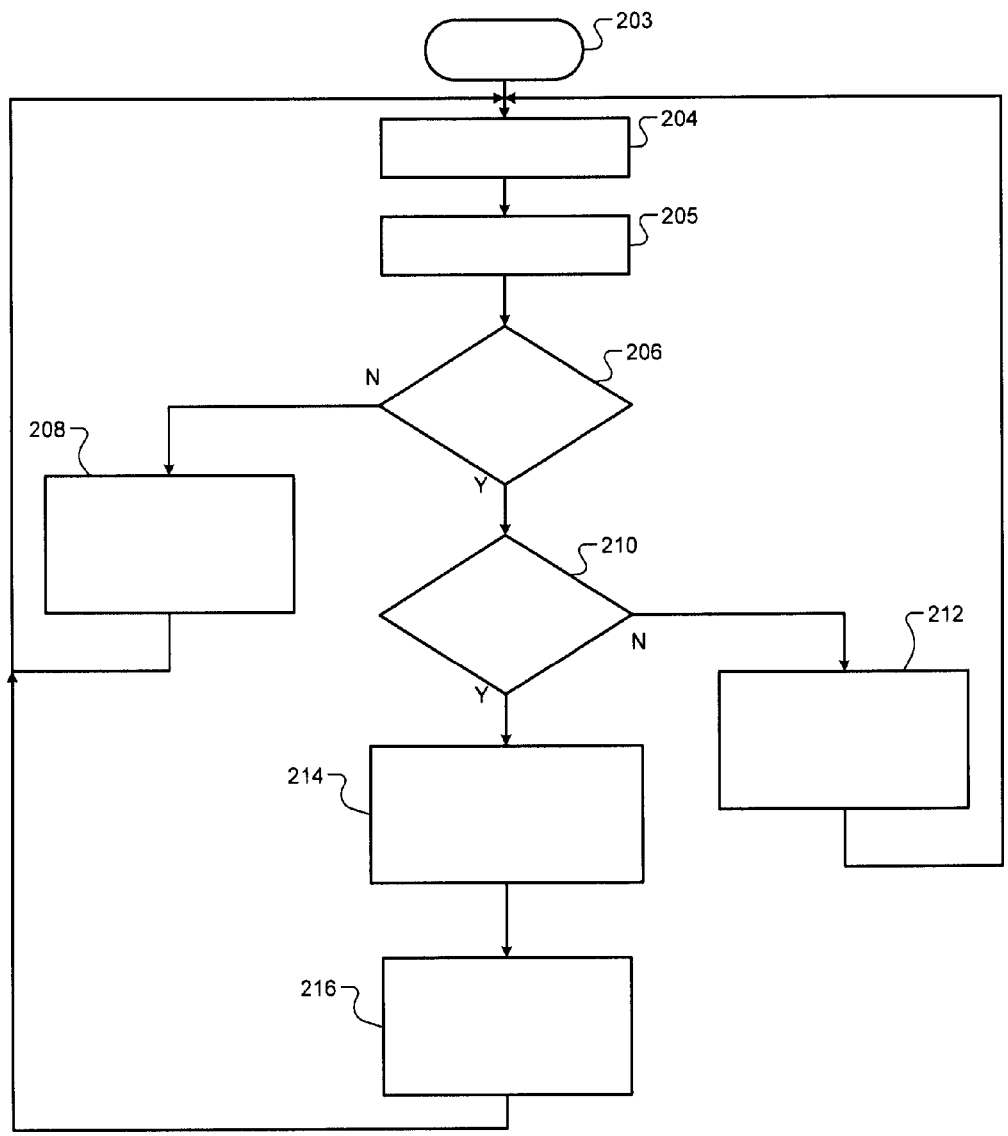
FIG. 6 illustrates a cooling system energy control method in accordance with the present disclosure.

The energy control system 15 and the cooling system 24 may be operated using numerous methods, an example method is provided by the method of FIG. 6. In FIG. 6, a cooling system energy control method is shown. Although the following tasks are primarily described with respect to the implementations of FIGS. 1-4, the tasks may be easily modified to apply to other implementations of the present disclosure. The tasks may be iteratively performed. The method may begin at 203.

At 204, sensor signals are generated including the first vehicle speed signal $V_{Spd1}$, temperature signals $T_{Cool}$, $T_{Oil}$, the pedal signals PEDAL1, PEDAL2. Other sensor signals, as described above may also be generated.

At 205, parameter signals, such as the second vehicle speed signal $V_{Spd2}$, brake signal BRK, temperature signal TEMP, and acceleration signal ACCEL, are generated via respective modules of the energy control module 17.

At 206, the mode determination module 160 determines whether the temperature signal TEMP is less than or equal to a predetermined temperature. Task 208 is performed when the temperature signal TEMP is greater than the predetermined temperature. Task 210 is performed when the temperature signal TEMP is less than or equal to the predetermined temperature.

At 208, the cooling system module 164 via the pump module 180, the fan module 182 and the shutter module 184 generate the cooling pump signal PUMP, the cooling fan signal FAN, and the shutter signal SHUT. At 208, the cooling system module 164 is operating in the temperature-based cooling mode and/or the maximum cooling mode. At 208, the cooling system module 164 may be operating in a non-DECO mode and a non-regenerative braking mode. The speed of the cooling pump 102, the speed of the cooling fan 104, and the position(s) of the shutter(s) 108 are set based on the temperature signal TEMP, as indicated by the signals PUMP, FAN, and SHUT. The cooling pump 102 is in a partially ON or fully ON state. The cooling fan 104 is in a partially ON or a fully ON state. The shutter(s) 108 are partially or fully opened.

The speed of the cooling pump 102, the speed of the cooling fan 104, and the position(s) of the shutter(s) 108 may also be set based on whether tasks 214-216 were previously performed. When over-cooling (or additional cooling) is provided during, for example, vehicle deceleration, DECO and/or regenerative braking events, a smaller amount of cooling may be initially provided during an under-cooling event that occurs subsequent to the over-cooling event. Task 208 may be performed during an under-cooling event. The amount of cooling in the under-cooling event may be initially less than that provided during the beginning of an event having similar ICE loading as the under-cooling event, but did not occur subsequent to an over-cooling event. The under-cooling event may occur subsequent to a zero-acceleration event and/or a zero-vehicle speed event and during a vehicle acceleration event, as shown in FIG. 3. Task 204 may be performed subsequent to task 208.

At 210, the mode determination module 160 determines whether DECO is enabled and/or whether regenerative braking is being performed, which may be indicated by the signals DECEL, REG. Task 212 is performed when DFCO is disabled and regenerative braking is not being performed. Task 214 is performed when DFCO is enabled and/or regenerative braking is being performed.

At 212, the cooling system module 164 via the pump module 180, the fan module 182 and the shutter module 184 generates the cooling pump signal PUMP, the cooling fan signal FAN, and the shutter signal SHUT. At 212, the cooling system module 164 is operating in the temperature-based cooling mode, a non-DFCO mode and a non-regenerative braking mode. The speed of the cooling pump 102, the speed of the cooling fan 104, and the position(s) of the shutter(s) 108 are set based on the temperature signal TEMP, as indicated by the signals PUMP, FAN, and SHUT. The cooling pump 102 is in a partially ON state or is deactivated. The cooling fan 104 is in a partially ON state or is deactivated. The shutter(s) 108 are partially open or fully closed. The speed of the cooling pump 102 may be less than the speed of the cooling pump 102 at 208 and is less than the speed of the cooling pump at 216. The speed of the cooling fan 104 may be less than the speed of the cooling fan 104 at 208 and may be less than the speed of the cooling fan 104 at 216. The shutter(s) 108 may be more closed than at 208 and are more closed than at 216.

The speed of the cooling pump 102, the speed of the cooling fan 104, and the position(s) of the shutter(s) 108 may also be set based on whether tasks 214-216 were previously performed. Task 212 may be performed as part of an under-cooling event and as a result may have initially a smaller amount of cooling than if tasks 214-216 were not previously performed. Task 204 may be performed subsequent to task 212.

In the following task 214, the cooling system module 164 is transitioning to operating in the DECO mode, the regenerative braking mode, the maximum cooling mode and/or the over-cooling mode. At 214, the generator module 162 generates the generator control signal GEN to increase the output voltage(s) of the generator(s) 90, the bus voltage 172, and voltage applied to the cooling pump 102 to a predetermined maximum voltage and/or the overvoltage.

In the following task 216, the cooling system module 164 is operating in the DFCO mode, the regenerative braking mode, the maximum cooling mode and/or the over-cooling mode. At 216, the cooling system module 164 via the pump module 180, the fan module 182 and the shutter module 184 generate the cooling pump signal PUMP, the cooling fan signal FAN, and the shutter signal SHUT. The cooling pump 102 is operated in a full ON and/or overvoltage state. The cooling fan 104 is operated in a full ON state. The shutter(s) 108 are in fully open position(s). Task 204 may be performed subsequent to task 216.

Although the above method includes performing over-cooling when the TEMP is less than or equal to the predetermined temperature, the over-cooling may be provided when regenerative braking is performed and the temperature signal TEMP is greater than the predetermined temperature. This may occur, for example, when wheel braking is performed subsequent to a high-engine loading event.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described implementations coordinate electric cooling pump operation with increased system voltages during regenerative braking events to reduce overall cooling pump energy and/or cooling pump energy used during non-regenerative braking events. The implementations as a result leverage more fuel free braking energy.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system comprising:
a mode module that generates a mode signal based on a temperature of an engine and at least one of a deceleration signal and a regenerative braking signal; and
an energy module that, based on the mode signal, increases cooling of a coolant of the engine during at least one of a deceleration event of a vehicle and a regenerative braking event,
wherein the energy module, while increasing the cooling of the coolant, supplies an overvoltage to a cooling pump of the engine.

2. The system of claim 1, wherein the energy module, while increasing the cooling of the coolant, maximizes a cooling rate of the coolant including generating a fan signal indicating operation of a cooling fan in a full ON state.

3. The system of claim 1, wherein the energy module, while increasing the cooling of the coolant, maximizes a cooling rate of the coolant including generating a shutter signal indicating opening an air flow shutter of a radiator to a fully open position.

4. The system of claim 1, wherein the overvoltage is a voltage greater than a predetermined voltage.

5. The system of claim 1, wherein the overvoltage is a voltage greater than a rated operating voltage of the cooling pump.

6. The system of claim 1, wherein the overvoltage is a voltage greater than a maximum operating voltage of the cooling pump used during non-deceleration events and non-regenerative braking events.

7. The system of claim 1, wherein the temperature is one of a coolant temperature and an oil temperature.

8. The system of claim 1, wherein:
the mode module generates the mode signal based on the deceleration signal; and
the deceleration signal indicates deceleration of the vehicle.

9. The system of claim 1, wherein:
the mode module generates the mode signal based on the deceleration signal; and
the deceleration signal indicates a deceleration fuel cutoff event.

10. The system of claim 1, further comprising a regenerative braking module that generates the regenerative braking signal in response to engine braking,
wherein the mode module generates the mode signal based on the regenerative braking signal.

11. The system of claim 1, further comprising a regenerative braking module that generates the regenerative braking signal in response to wheel braking,
wherein the mode module generates the mode signal based on the regenerative braking signal.

12. The system of claim 1, wherein the energy module:
operates the cooling pump in a fully ON state during the deceleration event; and
increases cooling of the coolant during an acceleration event, wherein the acceleration event occurs subsequent to the deceleration event.

13. The system of claim 12, wherein the energy module:
at least one of decreases a speed of the cooling pump and disables the cooling pump during a first zero-acceleration event, wherein the deceleration event occurs subsequent to the first zero-acceleration event; and
at least one of decreases speed and disables the cooling pump during a second zero-acceleration event, wherein the second zero-acceleration event occurs subsequent to the deceleration event, wherein the acceleration event occurs subsequent to the second zero-acceleration event, and wherein the speed of the cooling pump
is greater during the acceleration event than during the second zero-acceleration event, and
is less during the acceleration event than during the deceleration event.

14. The system of claim 1, wherein:
the mode module generates the mode signal based the deceleration signal and the regenerative braking signal; and the energy module, based on the mode signal, increases the cooling of the coolant during the deceleration event of the vehicle and the regenerative braking event.

15. A method comprising:
generating a mode signal based on a temperature of an engine and at least one of a deceleration signal and a regenerative braking signal;
based on the mode signal, increasing cooling of a coolant of the engine during at least one of a deceleration event of a vehicle and a regenerative braking event; and
supplies an overvoltage to a cooling pump of the engine while increasing the cooling of the coolant.

16. The method of claim 15, wherein, while increasing the cooling of the coolant, maximizing a cooling rate of the coolant including generating:
a fan signal indicating operation of a cooling fan in a full ON state; and
a shutter signal indicating opening an air flow shutter of a radiator to a fully open position.

17. The method of claim 15, wherein the overvoltage a voltage greater than:

a predetermined voltage; and
a maximum operating voltage of the cooling pump used during non-deceleration events and non-regenerative braking events.

18. The method of claim 15, wherein the deceleration signal indicates at least one of a deceleration of the vehicle and a deceleration fuel cutoff event.

19. The method of claim 15, further comprising:
generating the regenerative braking signal in response to at least one of engine braking and wheel braking; and
generating the mode signal based on the regenerative braking signal.

20. The method of claim 15, further comprising:
generating the mode signal based the deceleration signal and the regenerative braking signal; and
based on the mode signal, increasing the cooling of the coolant during the deceleration event of the vehicle and during the regenerative braking event.

* * * * *